(12) United States Patent
Kuo

(10) Patent No.: US 12,352,934 B2
(45) Date of Patent: Jul. 8, 2025

(54) PROJECTION LENS SYSTEM, PROJECTION APPARATUS AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 456 days.

(21) Appl. No.: 17/869,847

(22) Filed: Jul. 21, 2022

(65) Prior Publication Data

US 2023/0350170 A1    Nov. 2, 2023

(30) Foreign Application Priority Data

Apr. 29, 2022   (TW) .................. 111116348

(51) Int. Cl.
*G02B 13/16* (2006.01)
*G02B 13/18* (2006.01)
*G02B 15/20* (2006.01)

(52) U.S. Cl.
CPC ............. *G02B 13/16* (2013.01); *G02B 13/18* (2013.01); *G02B 15/20* (2013.01)

(58) Field of Classification Search
CPC .......... G02B 1/00; G02B 9/06; G02B 13/003; G02B 13/0065; G02B 13/008; G02B 13/16; G02B 13/18; G02B 15/142; G02B 15/20; G02B 21/36; G02B 21/364; G02B 27/18; G03B 3/00
USPC ....... 359/649, 651, 708, 717, 736, 748, 753, 359/793
See application file for complete search history.

(56) References Cited

U.S. PATENT DOCUMENTS

| | | | |
|---|---|---|---|
| 7,684,129 B1 * | 3/2010 | Wang ................... | G02B 13/003 359/717 |
| 2015/0253575 A1 | 9/2015 | Huang et al. | |
| 2016/0370529 A1 | 12/2016 | Angelini et al. | |
| 2019/0011680 A1 | 1/2019 | Tsai et al. | |
| 2019/0074413 A1 | 3/2019 | Streppel | |
| 2019/0154975 A1 | 5/2019 | Huang et al. | |
| 2019/0170986 A1 | 6/2019 | Tsai et al. | |
| 2019/0196145 A1 * | 6/2019 | Huang ................... | G02B 13/16 |
| 2019/0250422 A1 | 8/2019 | Liu et al. | |

(Continued)

FOREIGN PATENT DOCUMENTS

| CN | 2018094851 A1 | 5/2018 |
|---|---|---|
| CN | 108107654 A | 6/2018 |

(Continued)

OTHER PUBLICATIONS

Google Patents translation of CN 211086782 U (Year: 2020).*

*Primary Examiner* — Stephone B Allen
*Assistant Examiner* — Daniel J. Jordan
(74) *Attorney, Agent, or Firm* — troutman pepper locke; Tim Tingkang Xia, Esq.

(57) ABSTRACT

A projection lens system includes two lens elements being, in order from a magnification side to a reduction side along an optical path, a first lens element, and a second lens element. Each of the two lens elements has a magnification-side surface facing the magnification side and a reduction-side surface facing the reduction side. At least one of the magnification-side surface and the reduction-side surface of at least one of the two lens elements is aspheric.

19 Claims, 15 Drawing Sheets

(56) References Cited

U.S. PATENT DOCUMENTS

2021/0199967 A1    7/2021   Takagi
2021/0302627 A1    9/2021   Suzuki et al.
2021/0356731 A1   11/2021   Mogi
2023/0058624 A1    2/2023   Cirucci

FOREIGN PATENT DOCUMENTS

| | | | |
|---|---|---|---|
| CN | 109116510 A | | 1/2019 |
| CN | 109782415 A | | 5/2019 |
| CN | 211086782 U | * | 7/2020 |
| CN | 212255846 U | | 12/2020 |
| CN | 213182301 U | | 5/2021 |
| CN | 113281888 A | | 8/2021 |
| CN | 114624879 A | | 6/2022 |
| JP | 1990113216 | | 4/1990 |
| TW | 201018980 A | | 5/2010 |
| TW | M486063 U | | 9/2014 |
| TW | I627462 B | | 6/2018 |
| TW | I630434 B | | 7/2018 |
| TW | I755954 B | | 2/2022 |

\* cited by examiner

PROJECTION LENS SYSTEM, PROJECTION APPARATUS AND ELECTRONIC DEVICE

RELATED APPLICATIONS

This application claims priority to Taiwan Application Serial Number 111116348, filed on Apr. 29, 2022, which is incorporated by reference herein in its entirety.

BACKGROUND

Technical Field

The present disclosure relates to a projection lens system and a projection apparatus, and more particularly, to a projection lens system and a projection apparatus applicable to electronic devices.

Description of Related Art

With the rapid development of science and technology, the application range of electronic devices equipped with optical lenses has become even more extensive. For example, portable electronic devices can be equipped with functions such as scene detection and biometric identification, and the provision of projection lenses has become a basic feature in some products. While there is a trend for portable electronic devices to be equipped with more and more functions, there are also needs for those devices to be more compact in size. The present disclosure provides a projection lens system that can meet the requirement of miniaturization while achieving considerably good projection quality.

SUMMARY

According to one aspect of the present disclosure, a projection lens system comprises two lens elements. The two lens elements, in order from a magnification side to a reduction side along an optical path, are a first lens element and a second lens element. Each of the two lens elements has a magnification-side surface facing the magnification side and a reduction-side surface facing the reduction side. The first lens element has refractive power, and at least one of the magnification-side surface and the reduction-side surface of at least one of the two lens elements is aspheric. The projection lens system has a total of two lens elements, a refractive index of the first lens element with the d-line as a reference wavelength is Nd1, a refractive index of the second lens element with the d-line as a reference wavelength is Nd2, a central thickness of the first lens element is CT1, a central thickness of the second lens element is CT2, an axial distance between the first lens element and the second lens element is T12, and the following conditions are satisfied:

$1.650 < \min(Nd1, Nd2) < 1.900$; and $5.5 < (CT1+CT2)/T12 < 25$.

According to one aspect of the present disclosure, a projection lens system comprises two lens elements. The two lens elements, in order from a magnification side to a reduction side along an optical path, are a first lens element and a second lens element. Each of the two lens elements has a magnification-side surface facing the magnification side and a reduction-side surface facing the reduction side. The magnification-side surface of the second lens element is concave in a paraxial region thereof, and at least one of the magnification-side surface and the reduction-side surface of at least one of the two lens elements is aspheric. The projection lens system has a total of two lens elements, a refractive index of the first lens element with the d-line as a reference wavelength is Nd1, a refractive index of the second lens element with the d-line as a reference wavelength is Nd2, a central thickness of the first lens element is CT1, a central thickness of the second lens element is CT2, an axial distance between the first lens element and the second lens element is T12, and the following conditions are satisfied:

$1.650 < \min(Nd1, Nd2) < 1.900$; and $5.5 < (CT1+CT2)/T12 < 37$.

According to one aspect of the present disclosure, a projection apparatus comprises the aforementioned projection lens system and an imaging light source.

According to another aspect of the present disclosure, an electronic device comprises the aforementioned projection apparatus and a receiving apparatus corresponding to the projection apparatus.

DETAILED DESCRIPTION

Figure 1A:
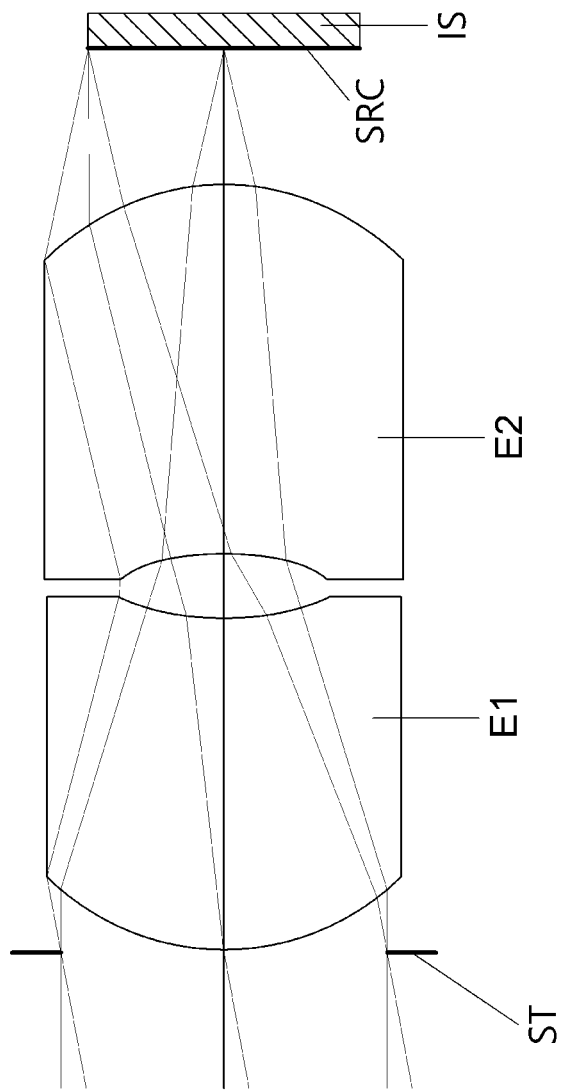
FIG. 1A is a schematic view of a projection apparatus according to the 1st embodiment of the present disclosure.

The present disclosure provides a projection lens system including two lens elements. The two lens elements, in order from a magnification side to a reduction side along an optical path, are a first lens element and a second lens element. Each of the two lens elements has a magnification-side surface facing the magnification side and a reduction-side surface facing the reduction side.

The first lens element may have positive refractive power to reduce the size of the projection lens system. The magnification-side surface of the first lens element may be convex in a paraxial region thereof, which is favorable for reducing the size of the projection lens system and adjusting the projection angle. The reduction-side surface of the first lens element may be concave in a paraxial region thereof to adjust the surface shapes and refractive power of the first lens element so as to improve the projection quality.

The second lens element may have positive refractive power to reduce the distance between the second lens element and an image source surface. The magnification-side surface of the second lens element may be concave in a paraxial region thereof to adjust the direction of light exiting the second lens element, so as to reduce the distance between the two lens elements. The reduction-side surface of the second lens element may be convex in a paraxial region thereof to adapt to the light exit angle of the imaging light source.

At least one of the magnification-side surface and the reduction-side surface of at least one of the two lens elements may be aspheric to increase variation in the surfaces of the lens elements, which is favorable for reducing the size of the projection lens system. Moreover, at least one of the two lens elements may have both the magnification-side surface and the reduction-side surface being aspheric. Moreover, both of the two lens elements may have both the magnification-side surface and the reduction-side surface being aspheric.

At least one of the two lens elements may be made of plastic material to improve mass production capacity and reduce the weight of lens elements.

The projection lens system may include an aperture stop on the magnification side of the first lens element to adjust the light traveling direction so as to reduce the size of the projection lens system. The projection lens system may include a diffractive optical element on the magnification side of the first lens element to extend the applications of the projection lens system. Moreover, the diffractive optical element may be disposed adjacent to the aperture stop. Moreover, the diffractive optical element and the aperture stop may also be the same component.

A refractive index of the first lens element with the d-line as a reference wavelength is Nd1, and a refractive index of the second lens element with the d-line as a reference wavelength is Nd2. When the following condition is satisfied: $1.650<\min(Nd1, Nd2)<1.900$, the projection quality can be improved and the size of the projection lens system can be reduced. Moreover, the following condition can be satisfied: $1.660<\min(Nd1, Nd2)<1.800$.

A central thickness of the first lens element is CT1, a central thickness of the second lens element is CT2, and an axial distance between the first lens element and the second lens element is T12. When at least one of the following conditions is satisfied: $5.5<(CT1+CT2)/T12$ and $(CT1+CT2)/T12<37$, the first lens element and the second lens element can coordinate better to achieve a balance between the size of the projection lens system and projection quality. Moreover, the following condition can be satisfied: $6.0<(CT1+CT2)/T12$. Moreover, the following condition can be satisfied: $6.5<(CT1+CT2)/T12$. Moreover, the following condition can be satisfied: $(CT1+CT2)/T12<30$. Moreover, the following condition can be satisfied: $(CT1+CT2)/T12<25$. Moreover, the following condition can be satisfied: $(CT1+CT2)/T12<20$. Moreover, the following condition can be satisfied: $(CT1+CT2)/T12<15$. Moreover, the following condition can be satisfied: $5.5<(CT1+CT2)/T12<37$. Moreover, the following condition can be satisfied: $5.5<(CT1+CT2)/T12<30$. Moreover, the following condition can be satisfied: $5.5<(CT1+CT2)/T12<25$. Moreover, the following condition can be satisfied: $6.0<(CT1+CT2)/T12<20$.

Half of a maximum field of view of the projection lens system is HFOV. When the following condition is satisfied: $4.0\ \text{degrees}<HFOV<35.0\ \text{degrees}$, the projection angles can be adjusted to suit different applications. Moreover, the following condition can be satisfied: $6.0\ \text{degrees}<HFOV<25.0\ \text{degrees}$. Moreover, the following condition can be satisfied: $8.0\ \text{degrees}<HFOV<15.0\ \text{degrees}$.

An axial distance between the magnification-side surface of the first lens element and the image source surface is TL. When the following condition is satisfied: $1.0\ \text{mm}<TL<5.0\ \text{mm}$, the size of the projection lens system can be reduced, and the total track length of the system would not be too short to reduce the projection quality.

The axial distance between the magnification-side surface of the first lens element and the image source surface is TL, and a focal length of the projection lens system is f. When the following condition is satisfied: $0.90<TL/f<1.5$, a balance between the size of the projection lens system and the projection angle can be favorably obtained.

The axial distance between the magnification-side surface of the first lens element and the image source surface is TL, and a maximum distance between a maximum field on the image source surface and an optical axis is YI. When the following condition is satisfied: $5.0<TL/YI<8.0$, a balance between the size of the projection lens system and the projection quality can be favorably obtained.

A focal length of the first lens element is f1, a curvature radius of the magnification-side surface of the first lens element is R1, and a curvature radius of the reduction-side surface of the first lens element is R2. When the following condition is satisfied: $2.7<f1/(R2-R1)$, the surface shapes and refractive power of the first lens element can be adjusted so as to reduce the total track length. Moreover, the following condition can be satisfied: $3.2<f1/(R2-R1)<20$. Moreover, the following condition can be satisfied: $3.6<f1/(R2-R1)<15$.

A focal length of the second lens element is f2, a curvature radius of the magnification-side surface of the second lens element is R3, and a curvature radius of the reduction-side surface of the second lens element is R4. When the following condition is satisfied: $|f2/(R3-R4)|<200$, the surface shapes and refractive power of the second lens element can be adjusted so as to improve the projection quality. Moreover, the following condition can be satisfied: $1.00<|f2/(R3-R4)|<175$. Moreover, the following condition can be satisfied: $2.00<|f2/(R3-R4)|<150$.

The focal length of the first lens element is f1, and the central thickness of the first lens element is CT1. When the following condition is satisfied: $0.50<f1/CT1<4.0$, the surface shapes and refractive power of the first lens element can be adjusted so as to reduce the sensitivity of the system and improve the manufacturing yield rate. Moreover, the following condition can be satisfied: $1.0<f1/CT1<3.0$. Moreover, the following condition can be satisfied: $1.5<f1/CT1<2.5$.

A maximum distance between an optically effective area of the magnification-side surface of the first lens element and the optical axis is Y11, and a displacement in parallel with the optical axis from an axial vertex on the magnification-side surface of the first lens element to a boundary of the optically effective area of the magnification-side surface of the first lens element is SAG11. When the following condition is satisfied: 1.8<Y11/SAG11<3.0, the surface shapes of the first lens element can be adjusted so as to allow light rays exiting the projection lens system to be more evenly distributed.

A maximum distance between an optically effective area of the reduction-side surface of the second lens element and the optical axis is Y22, and a displacement in parallel with the optical axis from an axial vertex on the reduction-side surface of the second lens element to a boundary of the optically effective area of the reduction-side surface of the second lens element is SAG22. When the following condition is satisfied: −3.3<Y22/SAG22<−1.6, the surface shapes of the second lens element can be adjusted, so as to allow light rays in each image field to have similar projection qualities. Moreover, SAG11 and SAG22 have positive values toward the reduction side and negative values toward the magnification side.

The focal length of the second lens element is f2, and the central thickness of the second lens element is CT2. When the following condition is satisfied: 0.50<f2/CT2<2.0, the surface shapes and refractive power of the second lens element can be adjusted so as to reduce the size of the projection lens system. Moreover, the following condition can be satisfied: 1.0<f2/CT2<1.8.

An absolute value of a chief ray angle on the image source surface in the maximum field of the projection lens system is |CRA|. When the following condition is satisfied: |CRA|<10.0 degrees, the projection lens system and the imaging light source can complement each other to improve projection efficiency. Moreover, the following condition can be satisfied: |CRA|<5.0 degrees. Moreover, the following condition can be satisfied: |CRA|<1.0 degree.

A numerical aperture of the projection lens system is NA. When the following condition is satisfied: 0.18<NA<0.32, the projection lens system can have satisfactory projection efficiency while having a good projection quality.

The maximum distance between the optically effective area of the magnification-side surface of the first lens element and the optical axis is Y11, and the maximum distance between the optically effective area of the reduction-side surface of the second lens element and the optical axis is Y22. When the following condition is satisfied: 0.80<Y11/Y22<1.2, the light traveling direction can be adjusted so as to balance the incident and refraction angles of light with the lens elements.

The present disclosure further provides a projection apparatus comprising the aforementioned projection lens system and an imaging light source.

The imaging light source can be formed of a vertical-cavity surface-emitting laser (VCSEL) array to improve the accuracy and expand the applications of the projection apparatus. The peak wavelength of the imaging light source can be between 780 nm and 1600 nm, and the use of infrared light could avoid causing disturbances to the user's operation. Moreover, the peak wavelength of the imaging light source can be between 800 nm and 1000 nm.

The present disclosure further provides an electronic device comprising the aforementioned projection apparatus and a receiving apparatus corresponding to the projection apparatus.

The aforementioned features of the projection lens system can be utilized in numerous combinations so as to achieve corresponding effects.

In the present disclosure, the magnification side and the reduction side are two sides of the projection lens system along an optical axis.

According to the projection lens system of the present disclosure, the optical elements thereof can be made of glass or plastic material. When the optical elements are made of glass material, the distribution of the refractive power of the projection lens system may be more flexible to design and the effect of external environmental temperature on imaging can be reduced. Technologies such as grinding or molding can be used for producing glass optical elements. When the optical elements are made of plastic material, manufacturing costs can be effectively reduced. Furthermore, surfaces of each optical element can be arranged to be spherical or aspheric (ASP). Arranging the spherical surfaces can simplify manufacturing while arranging the aspheric surfaces can provide more control variables for eliminating aberrations and to further decrease the required quantity of optical elements; also, the total track length of the projection lens system can be effectively reduced. Processes such as plastic injection molding or glass molding can be used for making the aspheric surfaces.

According to the projection lens system of the present disclosure, if a surface of an optical element is aspheric, it means that the surface has an aspheric shape throughout its optically effective area, or a portion(s) thereof.

According to the projection lens system of the present disclosure, additives may be selectively added to the material of any one (or more) optical element to change the transmittance of said optical element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, additives can prevent unwanted light in particular wavelength ranges affecting the final image. In addition, additives may be evenly mixed in the plastic material for manufacturing optical elements with an injection molding process.

Figure 7:
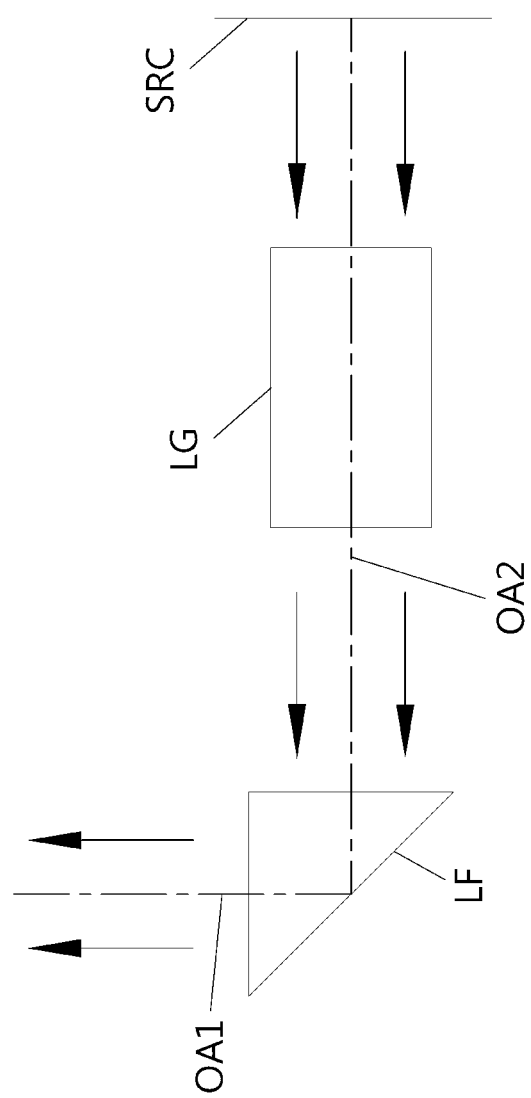
FIG. 7 is a schematic view of an arrangement which includes an optical path folding element in a projection lens system according to the present disclosure.
Figure 8:
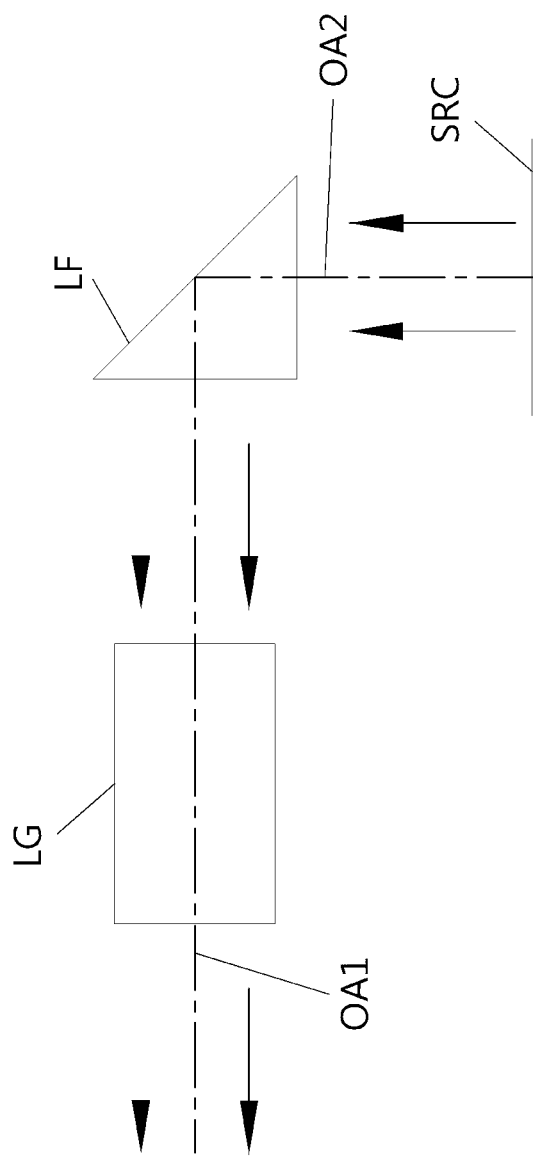
FIG. 8 is a schematic view of another arrangement which includes an optical path folding element in a projection lens system according to the present disclosure.
Figure 9:
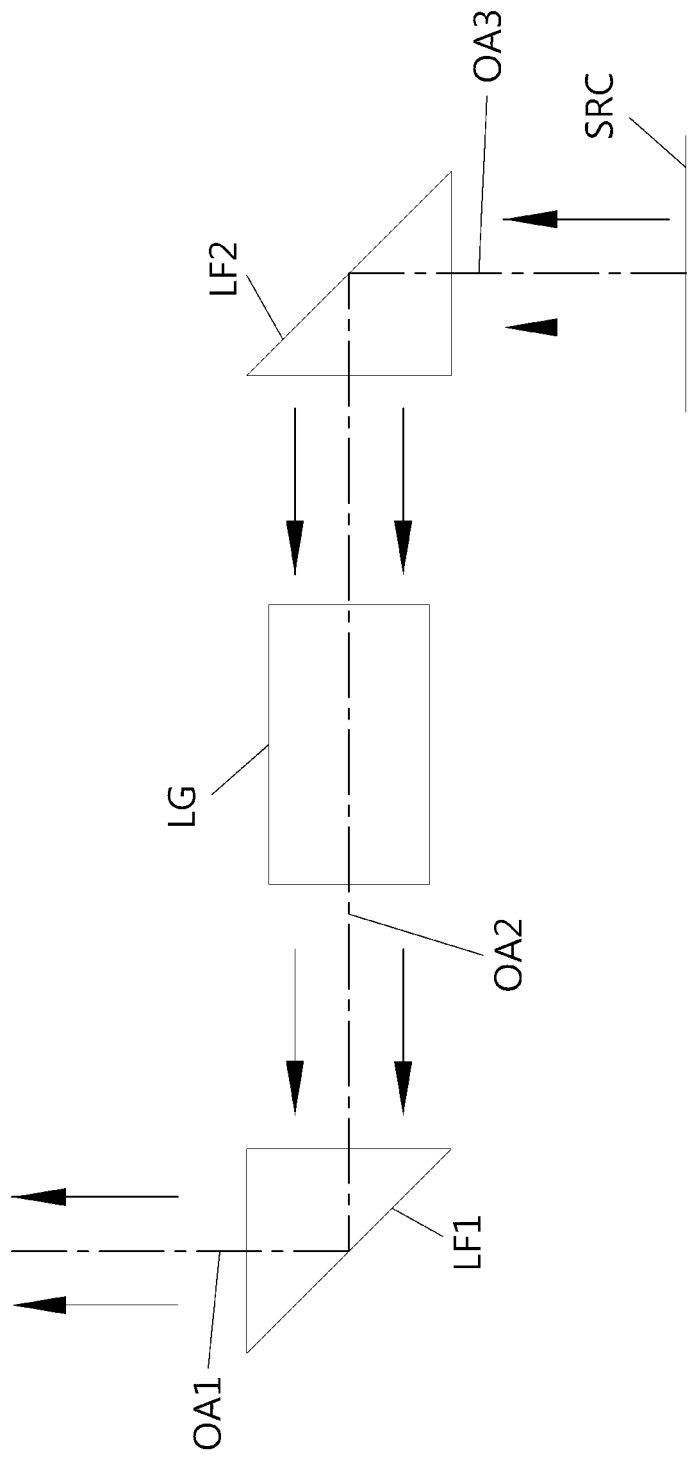
FIG. 9 is a schematic view of an arrangement which includes two optical path folding elements in a projection lens system according to the present disclosure.

In a projection lens system according to the present disclosure, at least one element capable of folding the optical path, such as a prism or a reflective mirror, can be optionally provided on the optical path between the image surface and the image source surface. Then, the projection lens system can be provided with more flexibility for its space arrangement, so that minimization of electronic devices is not limited by the total track length of the projection lens system. Please refer to FIGS. 7 and 8 for further details. FIG. 7 is a schematic view of an arrangement which includes an optical path folding element LF in a projection lens system according to the present disclosure, and FIG. 8 is a schematic view of another arrangement which includes an optical path folding element LF in a projection lens system according to the present disclosure. As shown in FIGS. 7 and 8, the projection lens system may include, in order from an image surface (not shown) to an image source surface SRC along an optical path, a first optical axis OA1, an optical path folding element LF, and a second optical axis OA2. The optical path folding element LF can be disposed between the image surface and the lens elements group LG of the projection lens system, as shown in FIG. 7; alternatively, the optical path folding element LF can be disposed between the lens elements group LG of the projection lens system and the image source surface SRC, as shown in FIG. 8. Moreover, please refer to FIG. 9, which is a schematic view of an arrangement including two optical path folding elements LF1 and LF2 in a projection lens system according to the present disclosure. As shown in FIG. 9, the projection lens system may include, in order from an image surface (not shown) to an image source surface SRC along an optical path, a first optical axis OA1, an optical path folding element LF1, a second optical axis OA2, another optical path folding element LF2, and a third optical axis OA3. In particular, the optical path folding element LF1 is disposed between the image surface and the lens elements group LG of the projection lens system, and the optical path folding element LF2 is disposed between the lens elements group LG of the projection lens system and the image source surface SRC. A projection lens system according to the present disclosure may optionally include more than three optical path folding elements, and the type, number or positions of the optical path folding elements are not limited to those shown in the drawings.

According to the projection lens system of the present disclosure, the projection lens system can include at least one stop, such as an aperture stop, a glare stop or a field stop, so as to favorably reduce the amount of stray light and thereby improve the projection quality.

According to the projection lens system of the present disclosure, an aperture stop can be configured as a front stop or a middle stop. The front stop is disposed between the image surface and the first lens element, and the middle stop is disposed between the first lens element and the image source surface.

An aperture control unit may be disposed in the projection lens system of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of projected light so as to further improve the projection quality. Meanwhile, the aperture control unit may represent the aperture in the present disclosure that can change the f-number to adjust the projection quality.

One or more optical elements can be provided in the projection lens system of the present disclosure to limit the forms of light passing through the system. The aforesaid optical element may be (but is not limited to) a filter or a polarizer, and may be provided in the form of a single piece, a composite component or a thin film, but is not limited thereto. The aforesaid optical element can be disposed on the magnification or reduction side of the projection lens system or alternatively between the lens elements of the system to control specific forms of light to pass through, so as to meet different application needs.

According to the projection lens system of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

Figure 5:
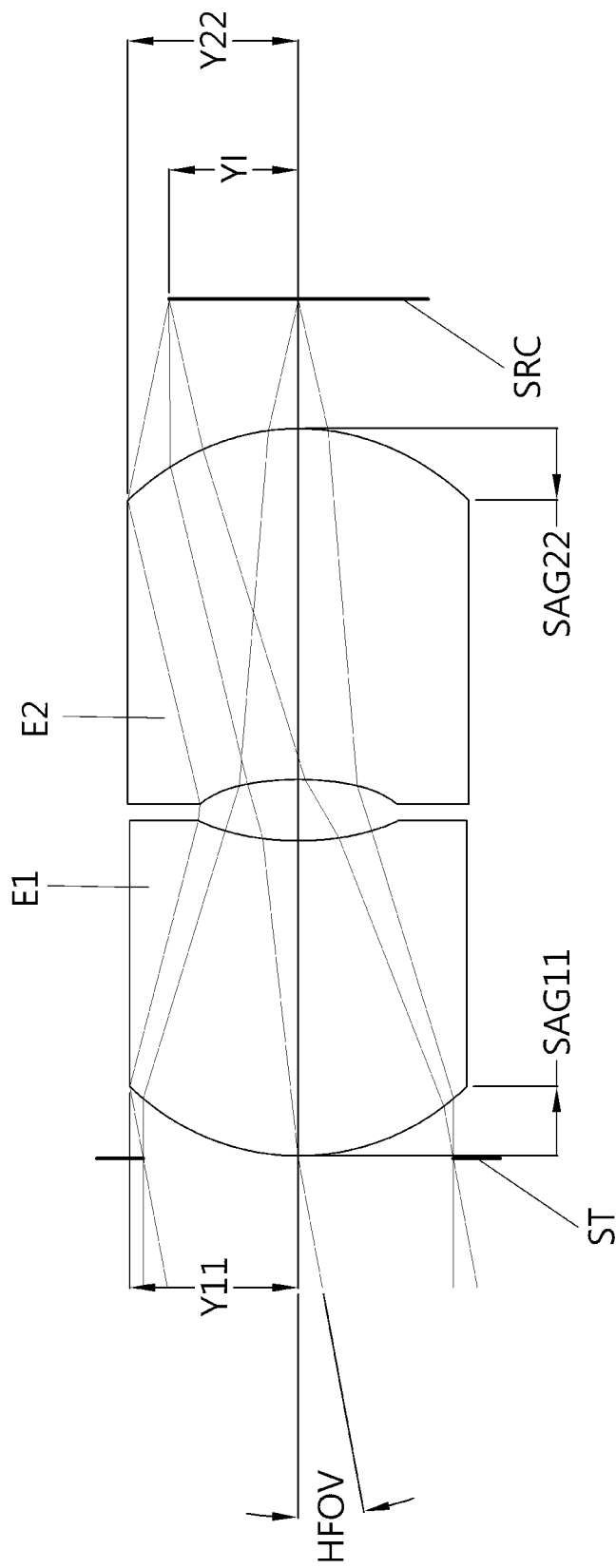
FIG. 5 is a schematic view showing the various parameters of the projection apparatus according to the 1st embodiment as illustrated in FIG. 1A.

FIG. 5 is a schematic view showing the various parameters of the projection lens system according to the present disclosure. As shown in FIG. 5, the projection lens system includes, in order from a magnification side to a reduction side along an optical path, an aperture stop ST, a first lens element E1, a second lens element E2, and an image source surface SRC. Half of a maximum field of view of the projection lens system is HFOV, a maximum distance between a maximum field on the image source surface and an optical axis is YI, a maximum distance between an optically effective area of a magnification-side surface of the first lens element E1 and the optical axis is Y11, a maximum distance between an optically effective area of a reduction-side surface of the second lens element E2 and the optical axis is Y22, a displacement in parallel with the optical axis from an axial vertex on the magnification-side surface of the first lens element E1 to a boundary of the optically effective area of the magnification-side surface of the first lens element E1 is SAG11, and a displacement in parallel with the optical axis from an axial vertex on the reduction-side surface of the second lens element E2 to a boundary of the optically effective area of the reduction-side surface of the second lens element E2 is SAG22. Moreover, in FIG. 5, SAG11 is a positive value and SAG22 is a negative value.

According to the above description of the present disclosure, the following specific embodiments are provided for further explanation.

1st Embodiment

Figure 1B:
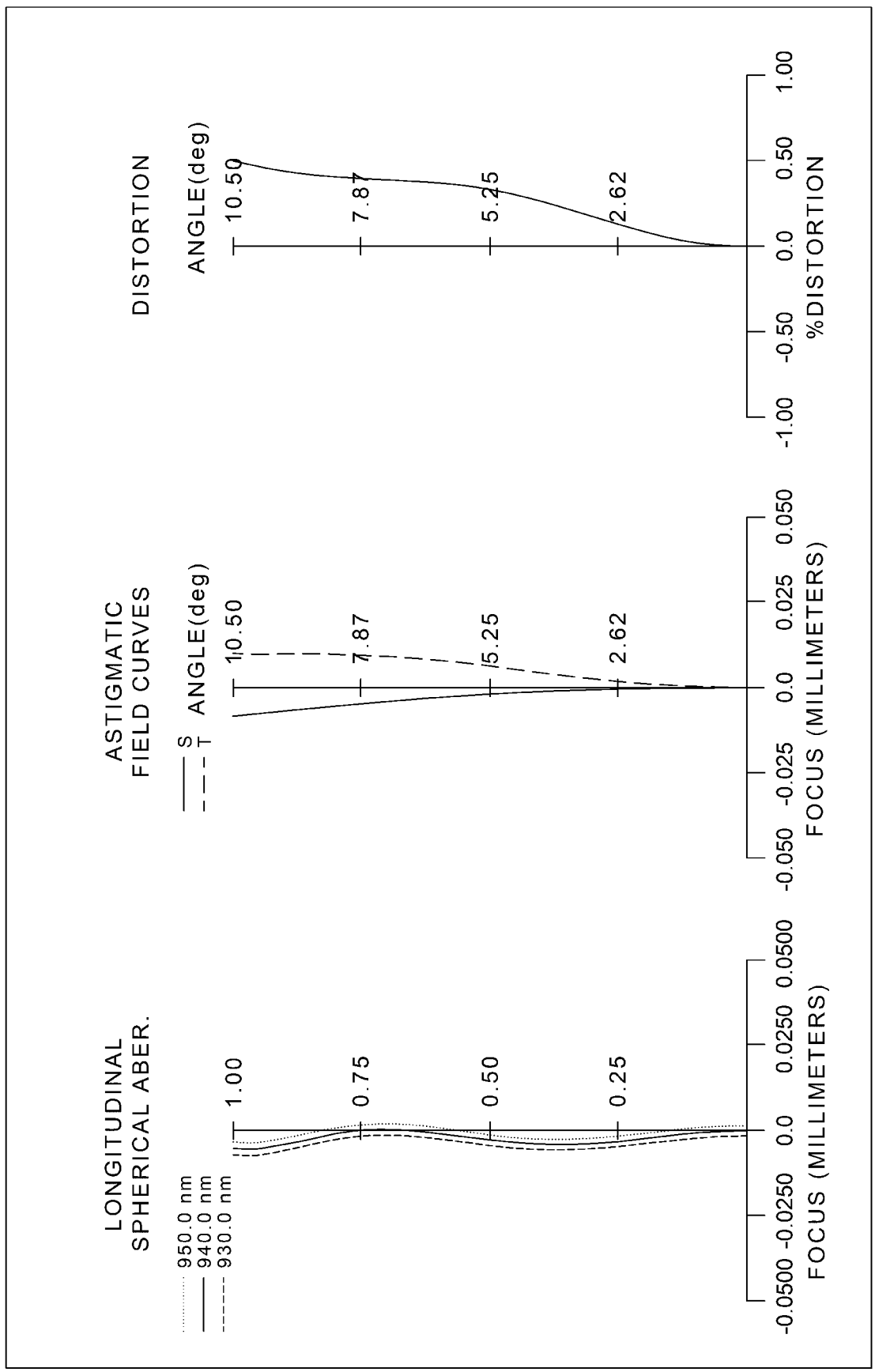
FIG. 1B shows longitudinal spherical aberration curves, astigmatic field curves and a distortion curve of the projection apparatus according to the 1st embodiment.

FIG. 1A is a schematic view of a projection apparatus 1 according to the 1st embodiment of the present disclosure. FIG. 1B shows, in order from left to right, longitudinal spherical aberration curves, astigmatic field curves and a distortion curve of the projection apparatus according to the 1st embodiment.

In FIG. 1A, the projection apparatus 1 includes a projection lens system of the present disclosure and an imaging light source IS. The projection lens system includes, in order from a magnification side to a reduction side along an optical path, an aperture stop ST, a first lens element E1, a second lens element E2, and an image source surface SRC. The imaging light source IS is disposed on the image source surface SRC, and can be formed of a vertical-cavity surface-emitting laser (VCSEL) array. Components used to form the imaging light source may include but are not limited to light-emitting diodes (LEDs), depending on actual needs. The peak wavelength of the imaging light source can be between 780 nm and 1600 nm. Moreover, the peak wavelength of the imaging light source can be between 800 nm and 1000 nm. In the 1st embodiment, the peak wavelength of the imaging light source is 940.0 nm.

The first lens element E1 has positive refractive power and is made of plastic material. The first lens element E1 has a magnification-side surface being convex in a paraxial region thereof, and a reduction-side surface being concave in a paraxial region thereof. Both the magnification-side surface and the reduction-side surface are aspheric.

The second lens element E2 has positive refractive power and is made of plastic material. The second lens element E2 has a magnification-side surface being concave in a paraxial region thereof, and a reduction-side surface being convex in a paraxial region thereof. Both the magnification-side surface and the reduction-side surface are aspheric.

The detailed optical data of the 1st embodiment are shown in TABLE TA, wherein the units of the curvature radius, the thickness and the focal length are expressed in mm, f is a focal length of the projection lens system, Fno is an f-number of the projection lens system, HFOV is half of a maximum field of view, and surfaces #0 to #6 refer to the surfaces in order from the magnification side to the reduction side. The aspheric surface data are shown in TABLE 1B, wherein k is the conic coefficient in the equation of the aspheric surface profiles, and A4-A12 refer to the 4th to 12th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1A and TABLE 1B for the 1st embodiment. Explanations in this regard will not be provided again.

TABLE 1A (1st Embodiment)
f = 2.69 mm, Fno = 2.24, HFOV = 10.5 deg.

| Surface # | | Curvature Radius | | Thickness | Material | Index | Abbe # | Focal length |
|---|---|---|---|---|---|---|---|---|
| 0 | Image Surface | Infinity | | 600.000 | | | | |
| 1 | Ape. Stop | Plano | | 0.010 | | | | |
| 2 | Lens 1 | 0.91581 | (ASP) | 1.220 | Plastic | 1.641 | 19.5 | 2.34 |
| 3 | | 1.12939 | (ASP) | 0.237 | | | | |
| 4 | Lens 2 | −1.26436 | (ASP) | 1.360 | Plastic | 1.641 | 19.5 | 1.81 |
| 5 | | −0.85917 | (ASP) | 0.501 | | | | |
| 6 | Image Source Surface | Plano | | — | | | | |

Remark: Reference wavelength is 940.0 nm.

TABLE 1B

Aspheric Coefficient

| Surface # | 2 | 3 | 4 | 5 |
|---|---|---|---|---|
| k = | 0.00000E+00 | 0.00000E+00 | 0.00000E+00 | 0.00000E+00 |
| A4 = | 1.18857E−03 | 4.57079E−01 | −8.38123E−01 | 1.90638E−01 |
| A6 = | −1.34037E−01 | −2.22219E+00 | −8.05146E+00 | −6.48769E−01 |
| A8 = | 4.53462E−01 | 4.84870E+01 | 1.11214E+02 | 2.80347E+00 |
| A10 = | −8.30254E−01 | −5.00503E+02 | −1.22438E+03 | −5.41930E+00 |
| A12 = | 4.73254E−01 | 1.83178E+03 | 3.84208E+03 | 4.76439E+00 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the 1st embodiment, the focal length of the projection lens system is f, and the following condition is satisfied: f=2.69 mm.

In the 1st embodiment, the f-number of the projection lens system is Fno, and the following condition is satisfied: Fno=2.24.

In the 1st embodiment, half of the maximum field of view of the projection lens system is HFOV, and the following condition is satisfied: HFOV=10.5 degrees.

In the 1st embodiment, a refractive index of the first lens element E1 with the d-line as a reference wavelength is Nd1, a refractive index of the second lens element E2 with the d-line as a reference wavelength is Nd2. When the reference wavelength is the helium d-line (587.6 nm), Nd1 is 1.669, Nd2 is 1.669, and the minimum value of them is min(Nd1, Nd2)=1.669. In TABLE TA, the refractive index is measured with 940.0 nm as the reference wavelength. The Abbe number is calculated by the following equation: (Nd−1)/(NF−NC), wherein Nd is the refractive index measured with the helium d-line (587.6 nm) as the reference wavelength, NF is the refractive index measured with the hydrogen F-line (486.1 nm) as the reference wavelength, and NC is the refractive index measured with the hydrogen C-line (656.3 nm) as the reference wavelength.

In the 1st embodiment, a central thickness of the first lens element E1 is CT1, a central thickness of the second lens element E2 is CT2, an axial distance between the first lens element E1 and the second lens element E2 is T12, and the following condition is satisfied: (CT1+CT2)/T12=10.89. In the 1st embodiment, the axial distance between every two adjacent lens elements is the axial distance between two adjacent surfaces of the two adjacent lens elements.

In the 1st embodiment, an axial distance between the magnification-side surface of the first lens element E1 and the image source surface SRC is TL, and the following condition is satisfied: TL=3.318 mm.

In the 1st embodiment, the axial distance between the magnification-side surface of the first lens element E1 and the image source surface SRC is TL, the focal length of the projection lens system is f, and the following condition is satisfied: TL/f=1.24.

In the 1st embodiment, the axial distance between the magnification-side surface of the first lens element E1 and the image source surface SRC is TL, a maximum distance between a maximum field on the image source surface SRC and the optical axis is YI, and the following condition is satisfied: TL/YI=6.64.

In the 1st embodiment, a focal length of the first lens element E1 is f1, a curvature radius of the magnification-side surface of the first lens element E1 is R1, a curvature radius of the reduction-side surface of the first lens element E1 is R2, and the following condition is satisfied: f1/(R2−R1)= 10.94.

In the 1st embodiment, a focal length of the second lens element E2 is f2, a curvature radius of the magnification-side surface of the second lens element E2 is R3, a curvature radius of the reduction-side surface of the second lens element E2 is R4, and the following condition is satisfied: |f2/(R3−R4)|=4.46.

In the 1st embodiment, the focal length of the first lens element E1 is f1, the central thickness of the first lens element E1 is CT1, and the following condition is satisfied: f1/CT1=1.92.

In the 1st embodiment, the focal length of the second lens element E2 is f2, the central thickness of the second lens element E2 is CT2, and the following condition is satisfied: f2/CT2=1.33.

In the 1st embodiment, an absolute value of a chief ray angle on the image source surface SRC in the maximum field of the projection lens system is |CRA|, and the following condition is satisfied: |CRA|=0.5 degrees.

In the 1st embodiment, a numerical aperture of the projection lens system is NA, and the following condition is satisfied: NA=0.22.

In the 1st embodiment, a maximum distance between an optically effective area of the magnification-side surface of the first lens element E1 and the optical axis is YT1, a maximum distance between an optically effective area of the reduction-side surface of the second lens element E2 and the optical axis is Y22, and the following condition is satisfied: Y11/Y22=0.99.

In the 1st embodiment, the maximum distance between the optically effective area of the magnification-side surface of the first lens element E1 and the optical axis is Y11, a displacement in parallel with the optical axis from an axial vertex on the magnification-side surface of the first lens element E1 to a boundary of the optically effective area of the magnification-side surface of the first lens element E1 is SAG11, and the following condition is satisfied: Y11/SAG11=2.43.

In the 1st embodiment, the maximum distance between the optically effective area of the reduction-side surface of the second lens element E2 and the optical axis is Y22, a displacement in parallel with the optical axis from an axial vertex on the reduction-side surface of the second lens element E2 to a boundary of the optically effective area of the reduction-side surface of the second lens element E2 is SAG22, and the following condition is satisfied: Y22/SAG22=−2.38.

Figure 6:
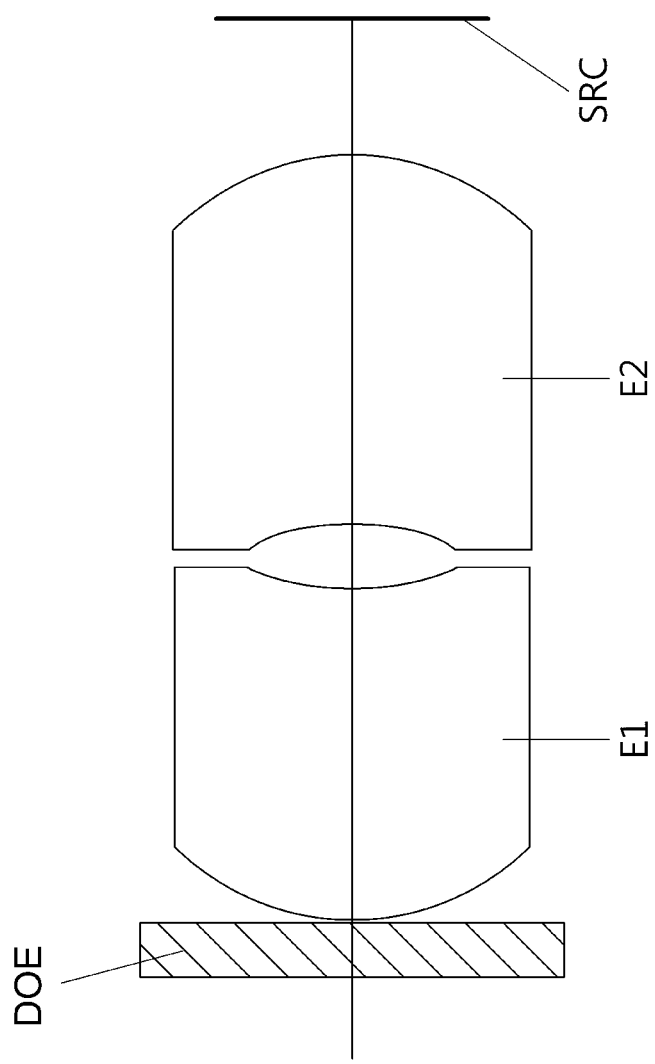
FIG. 6 is a schematic view of an alternative example of the projection apparatus according to the 1st embodiment as illustrated in FIG. 1A.

The projection lens system may include a diffractive optical element (DOE) on the magnification side of the first lens element E1. The aperture stop can be adjacent to the DOE, or the aperture stop and the DOE can be the same component. Please refer to FIG. 6, which is a schematic view of an alternative example of the projection apparatus according to the 1st embodiment. In this alternative example, the projection lens system includes a DOE on the magnification side of the first lens element E1, and the aperture stop and the DOE are the same component.

2nd Embodiment

Figure 2A:
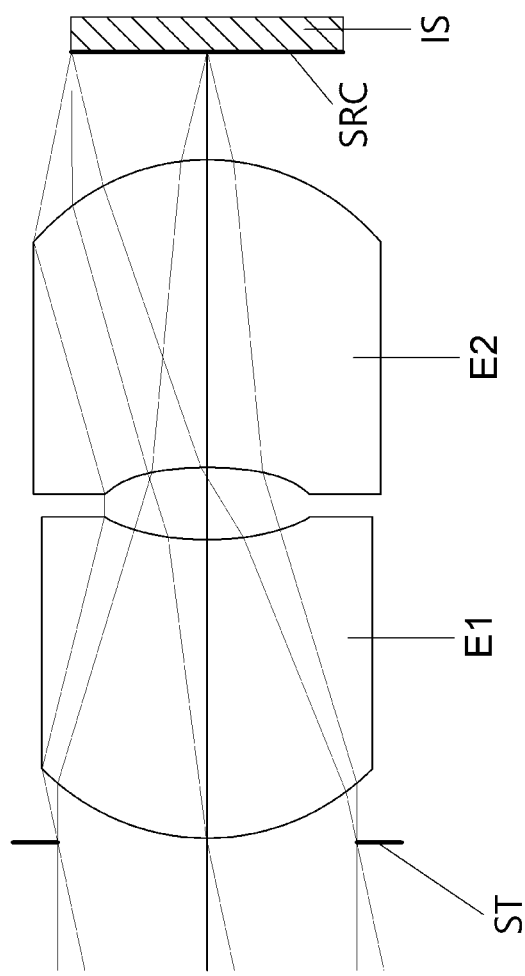
FIG. 2A is a schematic view of a projection apparatus according to the 2nd embodiment of the present disclosure.
Figure 2B:
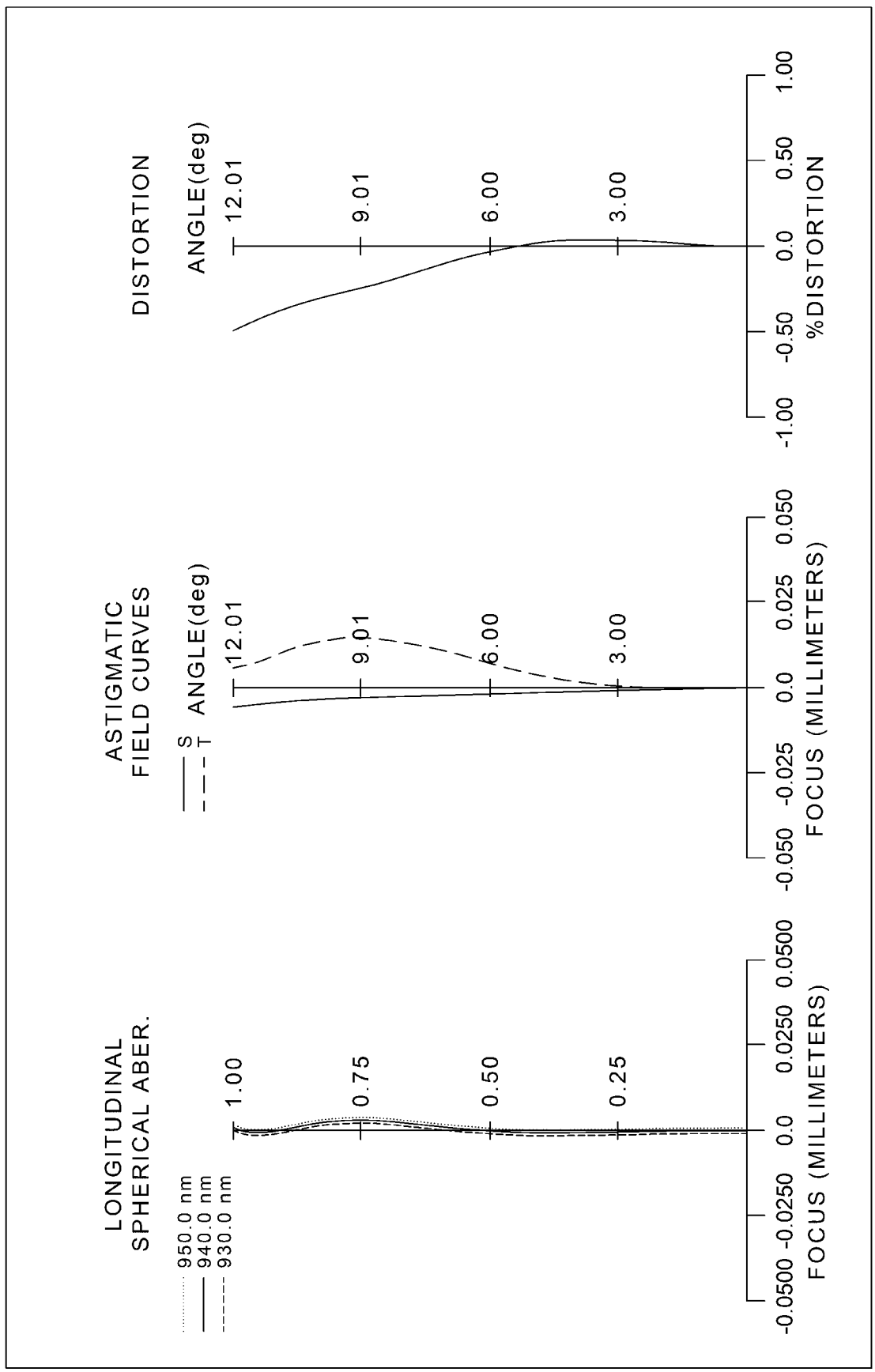
FIG. 2B shows longitudinal spherical aberration curves, astigmatic field curves and a distortion curve of the projection apparatus according to the 2nd embodiment.

FIG. 2A is a schematic view of a projection apparatus 2 according to the 2nd embodiment of the present disclosure. FIG. 2B shows, in order from left to right, longitudinal spherical aberration curves, astigmatic field curves and a distortion curve of the projection apparatus according to the 2nd embodiment.

In FIG. 2A, the projection apparatus 2 includes a projection lens system of the present disclosure and an imaging light source IS. The projection lens system includes, in order from a magnification side to a reduction side along an optical path, an aperture stop ST, a first lens element E1, a second lens element E2, and an image source surface SRC. The imaging light source IS is disposed on the image source surface SRC, and can be formed of a VCSEL array. In the 2nd embodiment, the peak wavelength of the imaging light source is 940.0 nm. The projection lens system may include a DOE on the magnification side of the first lens element E1. The projection apparatus 2 and its constituent elements can have a structural configuration similar to that of the 1st embodiment, which will not be repeated here.

The first lens element E1 has positive refractive power and is made of plastic material. The first lens element E1 has a magnification-side surface being convex in a paraxial region thereof, and a reduction-side surface being concave in a paraxial region thereof. Both the magnification-side surface and the reduction-side surface are aspheric.

The second lens element E2 has positive refractive power and is made of plastic material. The second lens element E2 has a magnification-side surface being concave in a paraxial region thereof, and a reduction-side surface being convex in a paraxial region thereof. Both the magnification-side surface and the reduction-side surface are aspheric.

The detailed optical data of the 2nd embodiment are shown in TABLE 2A, and the aspheric surface data are shown in TABLE 2B.

TABLE 2A (2nd Embodiment)
f = 1.50 mm, Fno = 2.15, HFOV = 12.0 deg.

| Surface # | | Curvature Radius | | Thickness | Material | Index | Abbe # | Focal length |
|---|---|---|---|---|---|---|---|---|
| 0 | Image Surface | Infinity | | 5000.000 | | | | |
| 1 | Ape. Stop | Plano | | 0.010 | | | | |
| 2 | Lens 1 | 0.53388 | (ASP) | 0.699 | Plastic | 1.634 | 20.4 | 1.37 |
| 3 | | 0.68420 | (ASP) | 0.169 | | | | |
| 4 | Lens 2 | −0.84630 | (ASP) | 0.721 | Plastic | 1.634 | 20.4 | 1.09 |
| 5 | | −0.50536 | (ASP) | 0.252 | | | | |
| 6 | Image Source Surface | Plano | | — | | | | |

Remark: Reference wavelength is 940.0 nm.

TABLE 2B

Aspheric Coefficient

| Surface # | 2 | 3 | 4 | 5 |
|---|---|---|---|---|
| k = | 0.00000E+00 | 0.00000E+00 | 0.00000E+00 | 0.00000E+00 |
| A4 = | −2.28174E−02 | 3.20884E+00 | −2.63167E+00 | 7.46907E−01 |
| A6 = | −7.45498E−01 | −7.21354E+01 | −2.47388E+02 | −1.64895E+01 |
| A8 = | −7.62894E+00 | 2.84983E+03 | 1.03875E+04 | 2.28584E+02 |
| A10 = | 1.19339E+02 | −6.01165E+04 | −2.50320E+05 | −1.44039E+03 |
| A12 = | −4.85982E+02 | 5.35239E+05 | 1.98500E+06 | 3.63308E+03 |

In the 2nd embodiment, the equation of the aspheric surface profiles of the aforementioned lens elements is the same as the equation of the 1 st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 2A and TABLE 2B and satisfy the conditions stated in TABLE 2C below.

TABLE 2C

| f [mm] | 1.50 | f1/(R2−R1) | 9.09 |
|---|---|---|---|
| Fno | 2.15 | |f2/(R3−R4)| | 3.19 |
| HFOV [deg.] | 12.0 | f1/CT1 | 1.95 |
| Nd1 | 1.660 | f2/CT2 | 1.51 |
| Nd2 | 1.660 | |CRA| [deg.] | 0.5 |
| min(Nd1, Nd2) | 1.660 | NA | 0.23 |
| (CT1 + CT2)/T12 | 8.40 | Y11/Y22 | 0.95 |
| TL [mm] | 1.841 | Y11/SAG11 | 2.38 |

TABLE 2C-continued

| TL/f | 1.23 | Y22/SAG22 | −2.12 |
|---|---|---|---|
| TL/YI | 5.79 | | |

3rd Embodiment

Figure 3A:
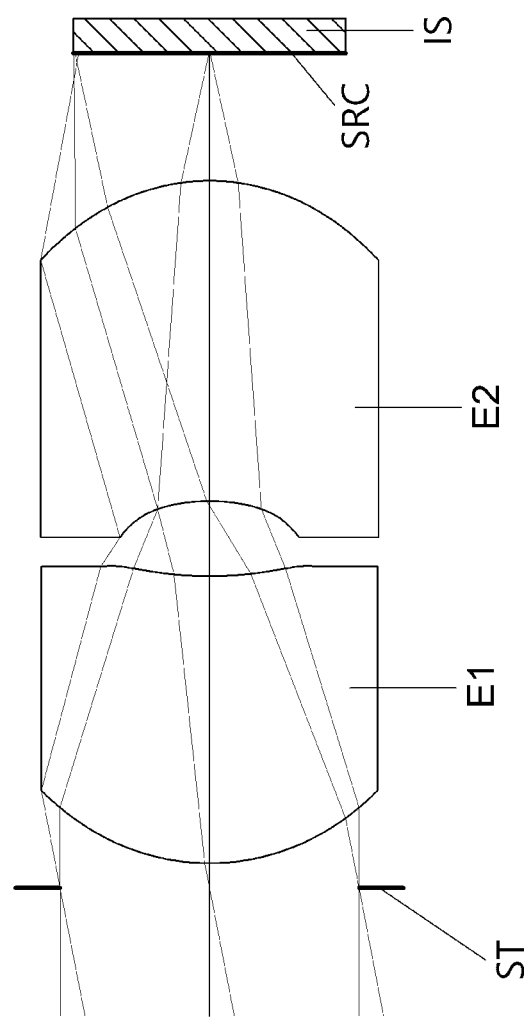
FIG. 3A is a schematic view of a projection apparatus according to the 3rd embodiment of the present disclosure.
Figure 3B:
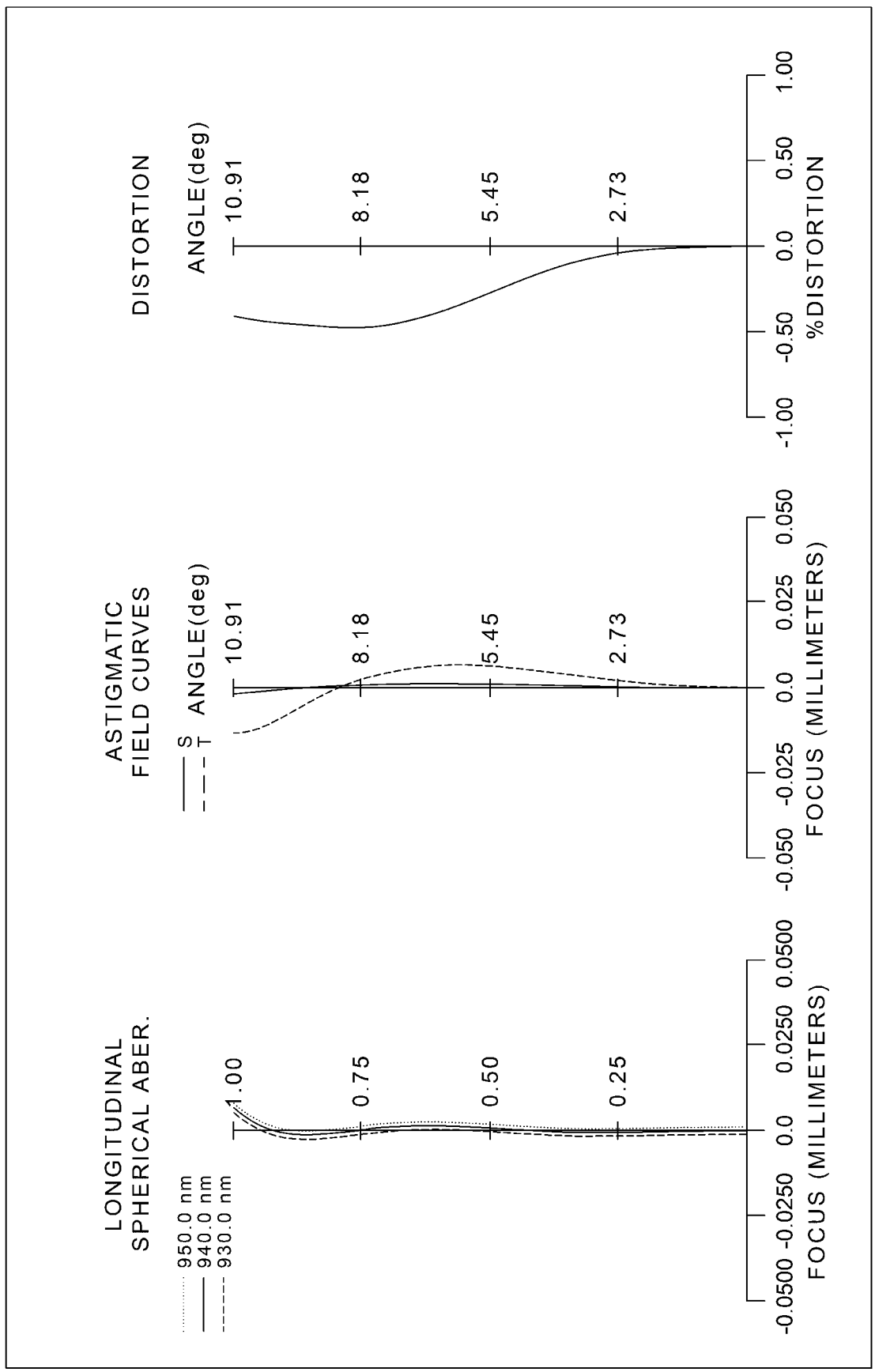
FIG. 3B shows longitudinal spherical aberration curves, astigmatic field curves and a distortion curve of the projection apparatus according to the 3rd embodiment.

FIG. 3A is a schematic view of a projection apparatus 3 according to the 3rd embodiment of the present disclosure. FIG. 3B shows, in order from left to right, longitudinal spherical aberration curves, astigmatic field curves and a distortion curve of the projection apparatus according to the 3rd embodiment.

In FIG. 3A, the projection apparatus 3 includes a projection lens system of the present disclosure and an imaging light source IS. The projection lens system includes, in order from a magnification side to a reduction side along an optical path, an aperture stop ST, a first lens element E1, a second lens element E2, and an image source surface SRC. The imaging light source IS is disposed on the image source surface SRC, and can be formed of a VCSEL array. In the 3rd embodiment, the peak wavelength of the imaging light source is 940.0 nm. The projection lens system may include a DOE on the magnification side of the first lens element E1. The projection apparatus 3 and its constituent elements can have a structural configuration similar to that of the 1st embodiment, which will not be repeated here.

The first lens element E1 has positive refractive power and is made of plastic material. The first lens element E1 has a magnification-side surface being convex in a paraxial region thereof, and a reduction-side surface being concave in a paraxial region thereof. Both the magnification-side surface and the reduction-side surface are aspheric.

The second lens element E2 has positive refractive power and is made of plastic material. The second lens element E2 has a magnification-side surface being concave in a paraxial region thereof, and a reduction-side surface being convex in a paraxial region thereof. Both the magnification-side surface and the reduction-side surface are aspheric.

The detailed optical data of the 3rd embodiment are shown in TABLE 3A, and the aspheric surface data are shown in TABLE 3B.

TABLE 3A (3rd Embodiment)
f = 1.66 mm, Fno = 2.37, HFOV = 10.9 deg.

| Surface # | | Curvature Radius | | Thickness | Material | Index | Abbe # | Focal length |
|---|---|---|---|---|---|---|---|---|
| 0 | Image Surface | Infinity | | 500.00 | | | | |
| 1 | Ape. Stop | Plano | | 0.058 | | | | |
| 2 | Lens 1 | 0.52539 | (ASP) | 0.673 | Plastic | 1.656 | 18.4 | 1.17 |
| 3 | | 0.81255 | (ASP) | 0.176 | | | | |
| 4 | Lens 2 | −0.46253 | (ASP) | 0.751 | Plastic | 1.656 | 18.4 | 1.26 |
| 5 | | −0.48754 | (ASP) | 0.299 | | | | |
| 6 | Image Source Surface | Plano | | — | | | | |

Remark: Reference wavelength is 940.0 nm.

TABLE 3B

| Aspheric Coefficient | | | | |
|---|---|---|---|---|
| Surface # | 2 | 3 | 4 | 5 |
| k = | 0.00000E+00 | 0.00000E+00 | 0.00000E+00 | 0.00000E+00 |
| A4 = | −8.46047E−02 | −2.37675E−01 | −8.94664E+00 | 2.71828E−01 |
| A6 = | −1.51189E+00 | −5.21458E+01 | −2.39149E+02 | −6.30730E+00 |
| A8 = | 1.14805E+01 | 1.54446E+03 | 1.47578E+04 | 1.58995E+02 |
| A10 = | −5.37924E+01 | −4.98478E+04 | −6.16130E+05 | −1.18730E+03 |
| A12 = | −1.13307E+02 | 3.55544E+05 | 6.80572E+06 | 3.43157E+03 |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 3A and TABLE 3B and satisfy the conditions stated in TABLE 3C below.

TABLE 3C

| f [mm] | 1.66 | f1/(R2−R1) | 4.09 |
|---|---|---|---|
| Fno | 2.37 | |f2/(R3−R4)| | 50.42 |
| HFOV [deg.] | 10.9 | f1/CT1 | 1.75 |
| Nd1 | 1.686 | f2/CT2 | 1.68 |
| Nd2 | 1.686 | |CRA| [deg.] | 0.5 |
| min(Nd1, Nd2) | 1.686 | NA | 0.21 |
| (CT1 + CT2)/T12 | 8.09 | Y11/Y22 | 1.00 |
| TL [mm] | 1.899 | Y11/SAG11 | 2.31 |

TABLE 3C-continued

| TL/f | 1.15 | Y22/SAG22 | −2.13 |
|---|---|---|---|
| TL/YI | 5.97 | | |

4th Embodiment

Figure 4A:
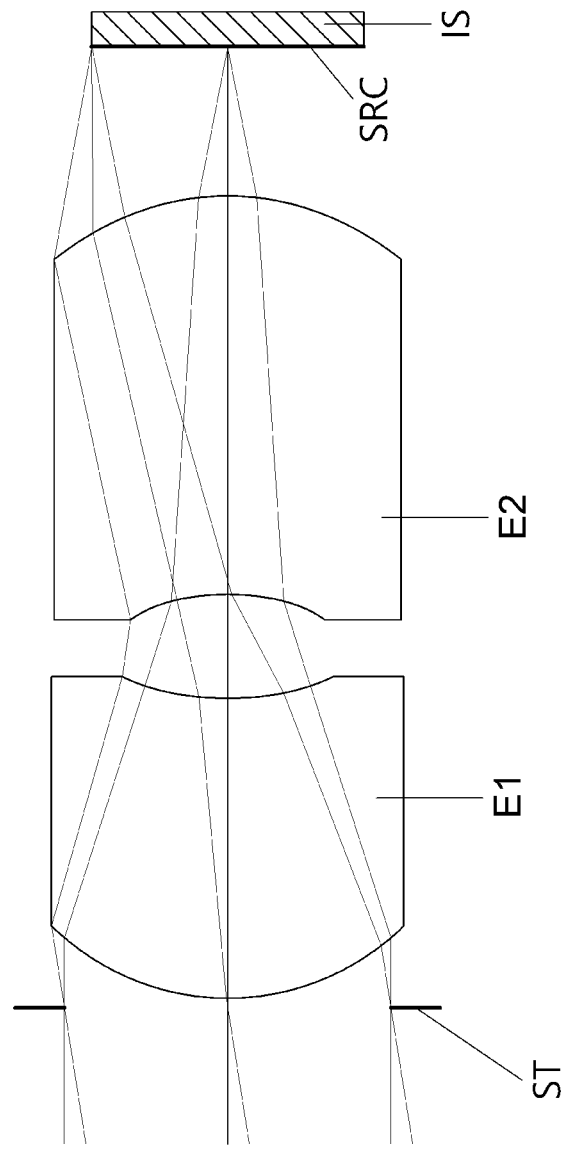
FIG. 4A is a schematic view of a projection apparatus according to the 4th embodiment of the present disclosure.
Figure 4B:
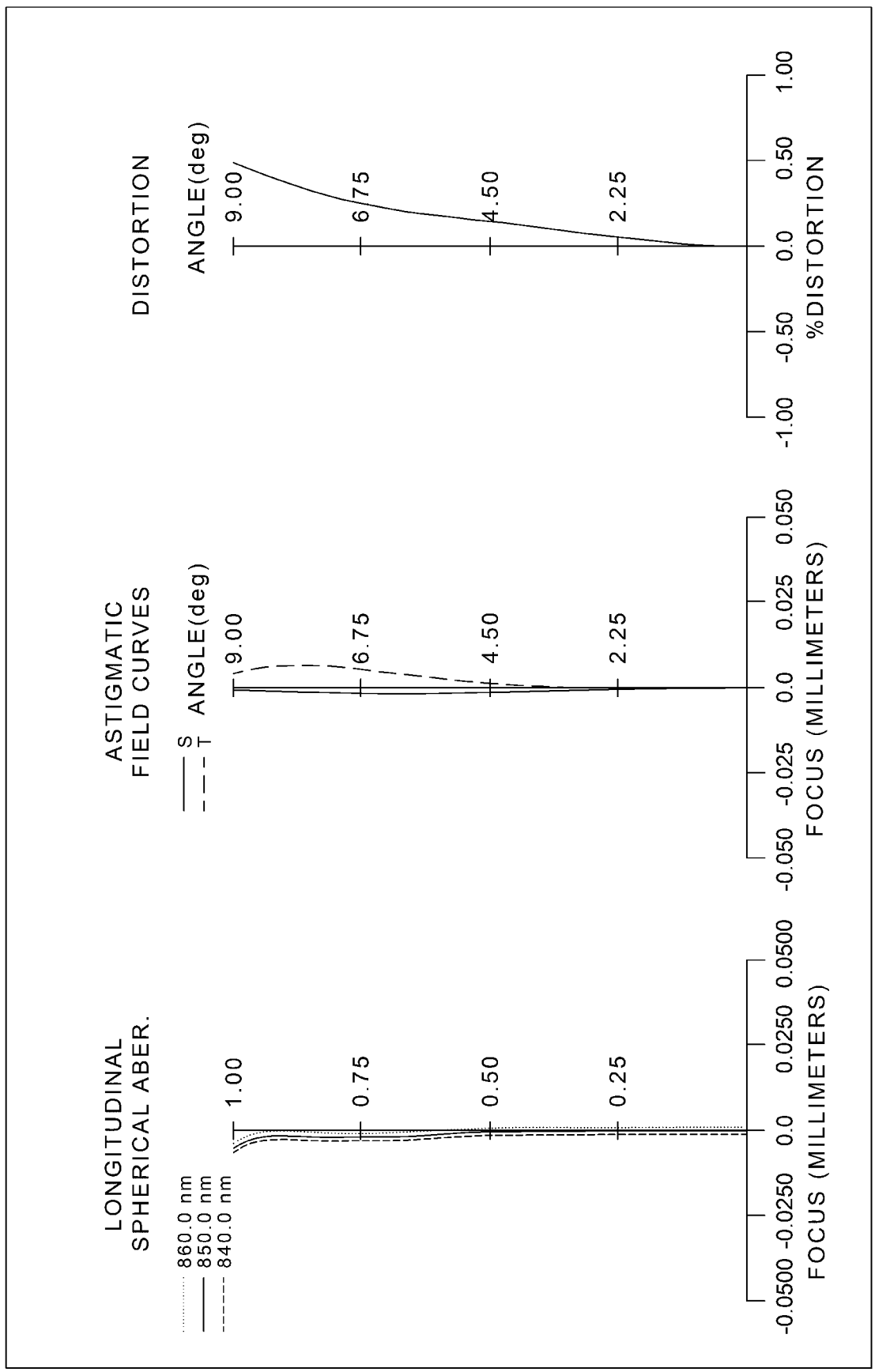
FIG. 4B shows longitudinal spherical aberration curves, astigmatic field curves and a distortion curve of the projection apparatus according to the 4th embodiment.

FIG. 4A is a schematic view of a projection apparatus 4 according to the 4th embodiment of the present disclosure. FIG. 4B shows, in order from left to right, longitudinal spherical aberration curves, astigmatic field curves and a distortion curve of the projection apparatus according to the 4th embodiment.

In FIG. 4A, the projection apparatus 4 includes a projection lens system of the present disclosure and an imaging light source IS. The projection lens system includes, in order from a magnification side to a reduction side along an optical path, an aperture stop ST, a first lens element E1, a second lens element E2, and an image source surface SRC. The imaging light source IS is disposed on the image source surface SRC, and can be formed of a VCSEL array. In the 4th embodiment, the peak wavelength of the imaging light source is 850.0 nm. The projection lens system may include a DOE on the magnification side of the first lens element E1. The projection apparatus 4 and its constituent elements can have a structural configuration similar to that of the 1st embodiment, which will not be repeated here.

The first lens element E1 has positive refractive power and is made of glass material. The first lens element E1 has a magnification-side surface being convex in a paraxial region thereof, and a reduction-side surface being concave in a paraxial region thereof. Both the magnification-side surface and the reduction-side surface are aspheric.

The second lens element E2 has positive refractive power and is made of plastic material. The second lens element E2 has a magnification-side surface being concave in a paraxial region thereof, and a reduction-side surface being convex in a paraxial region thereof. Both the magnification-side surface and the reduction-side surface are aspheric.

The detailed optical data of the 4th embodiment are shown in TABLE 4A, and the aspheric surface data are shown in TABLE 4B.

TABLE 4A (4th Embodiment)
f = 3.14 mm. Fno = 2.62, HFOV = 9.0 deg.

| Surface # | | Curvature Radius | | Thickness | Material | Index | Abbe # | Focal length |
|---|---|---|---|---|---|---|---|---|
| 0 | Image Surface | Infinity | | 4000.000 | | | | |
| 1 | Ape. Stop | Plano | | 0.035 | | | | |
| 2 | Lens 1 | 0.91112 | (ASP) | 1.103 | Glass | 1.683 | 53.2 | 2.29 |
| 3 | | 1.10917 | (ASP) | 0.382 | | | | |
| 4 | Lens 2 | −0.94479 | (ASP) | 1.466 | Plastic | 1.673 | 14.0 | 2.15 |
| 5 | | −0.92897 | (ASP) | 0.548 | | | | |
| 6 | Image Source Surface | Plano | | — | | | | |

Remark: Reference wavelength is 850.0 nm.

TABLE 4B

| Aspheric Coefficient | | | | |
|---|---|---|---|---|
| Surface # | 2 | 3 | 4 | 5 |
| k = | 0.00000E+00 | 0.00000E+00 | 0.00000E+00 | 0.00000E+00 |
| A4 = | −8.24236E−03 | 3.96302E−01 | −7.82460E−01 | 1.21236E−01 |
| A6 = | −6.53451E−02 | −2.45275E+00 | −7.73276E+00 | −2.61321E−01 |
| A8 = | 2.64338E−01 | 4.90078E+01 | 9.36103E+01 | 1.30873E+00 |
| A10 = | −7.07505E−01 | −3.56605E+02 | −8.88540E+02 | −2.53919E+00 |
| A12 = | 5.97180E−01 | 1.00284E+03 | 2.44040E+03 | 2.12984E+00 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 4A and TABLE 4B and satisfy the conditions stated in TABLE 4C below.

TABLE 4C

| f [mm] | 3.14 | f1/(R2-R1) | 11.58 |
|---|---|---|---|
| Fno | 2.62 | |f2/(R3-R4)| | 136.07 |
| HFOV [deg.] | 9.0 | f1/CT1 | 2.08 |
| Nd1 | 1.693 | f2/CT2 | 1.47 |
| Nd2 | 1.705 | |CRA| [deg.] | 0.5 |
| min(Nd1, Nd2) | 1.693 | NA | 0.19 |
| (CT1 + CT2)/T12 | 6.73 | Y11/Y22 | 1.02 |
| TL [mm] | 3.499 | Y11/SAG11 | 2.43 |
| TL/f | 1.11 | Y22/SAG22 | −2.73 |
| TL/YI | 7.00 | | |

5th Embodiment

Figure 10A:
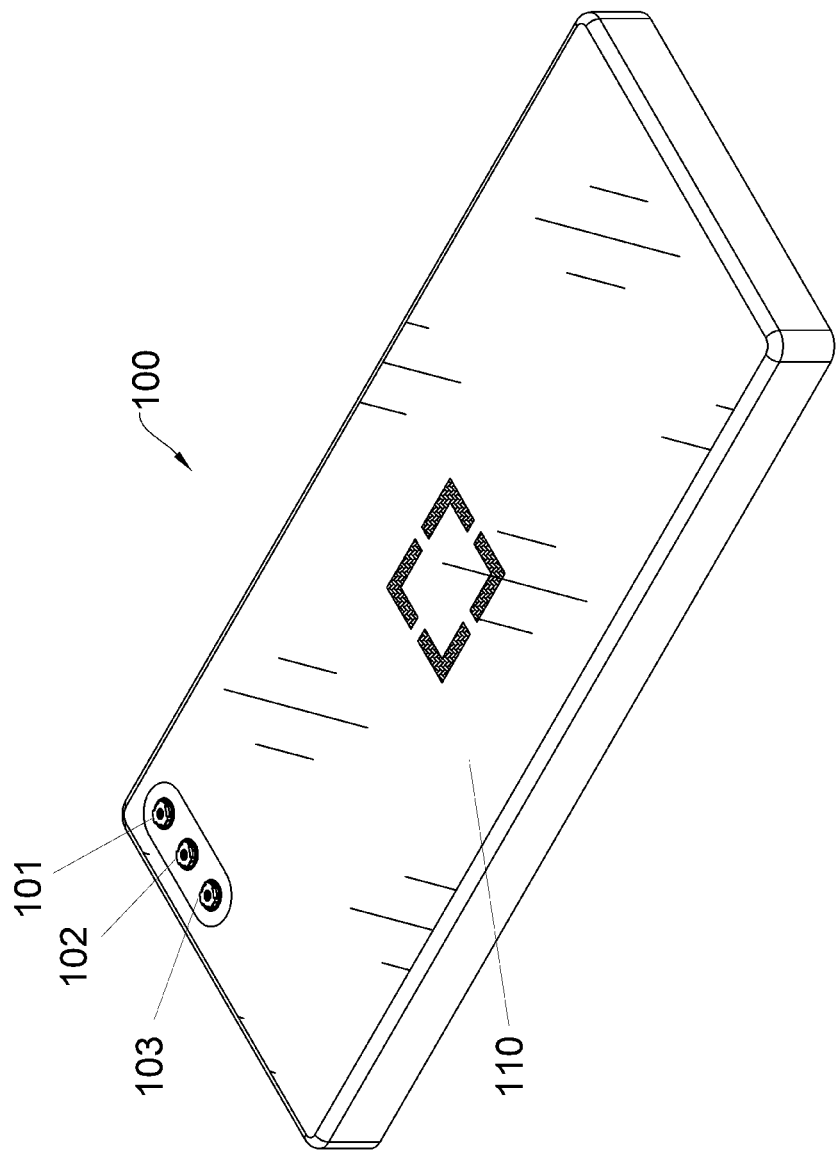
FIG. 10A is a front view of an electronic device according to the 5th embodiment of the present disclosure.
Figure 10B:
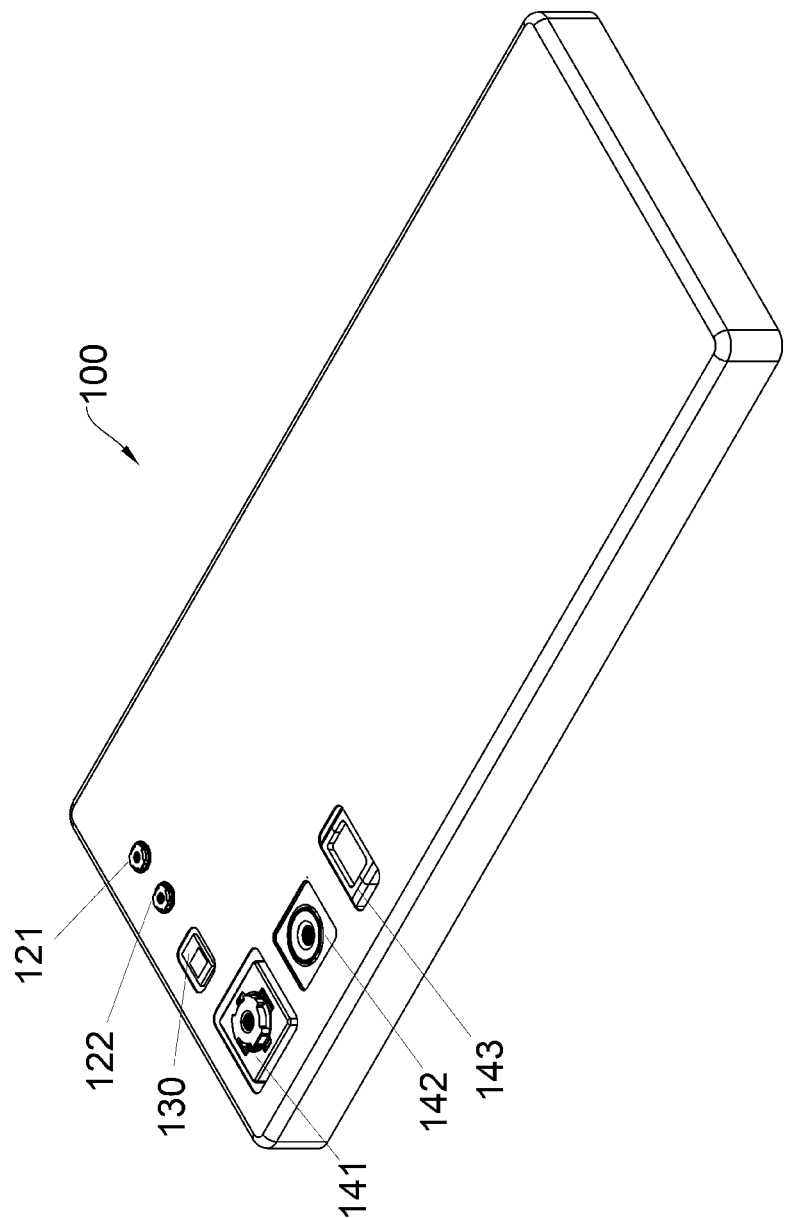
FIG. 10B is a rear view of the electronic device according to the 5th embodiment of the present disclosure.

Please refer to FIG. 10A and FIG. 10B. FIG. 10A is a schematic front view of an electronic device 100 according to the 5th embodiment of the present disclosure. FIG. 10B is a schematic rear view of the electronic device 100 according to the 5th embodiment shown in FIG. 10A. In the present embodiment, the electronic device 100 is a smartphone.

As FIG. 10A shows, the electronic device 100 includes a wide-angle imaging apparatus 101, a projection apparatus 102, a receiving apparatus 103, and a display 110 on the front side of the electronic device 100. The projection apparatus 102 includes a projection lens system of the present disclosure and an imaging light source, wherein the projection lens system can include a DOE. The projection apparatus 102 and its constituent elements can have a structural configuration similar to those described in the previous embodiments, which will not be repeated here. The receiving apparatus 103 can include a receiving lens system and an image sensor. The receiving apparatus 103 can be equipped with a band-pass filtering feature, so that light emitted from the imaging light source can be received by the image sensor. In particular, the projection apparatus 102 and the receiving apparatus 103 can work in a complementary manner. After light is emitted by the imaging light source, the light passes through the projection lens system and other optical elements such as a DOE and is redistributed. Next, after being reflected by an imaged object, the light passes through the receiving lens system and reaches the image sensor. Then, after the computation of a processor, functions such as scene detection or biometric identification can be achieved.

As FIG. 10B shows, the electronic device 100 includes a projection apparatus 121, a receiving apparatus 122, a flash module 130, a wide-angle imaging apparatus 141, an ultra-wide-angle imaging apparatus 142, and a telephoto imaging apparatus 143 capable of folding the optical path on the back side of the electronic device 100. The projection apparatus 121 includes a projection lens system of the present disclosure and an imaging light source, and can also include a DOE. The projection apparatus 121 can have a structural configuration similar to that of the projection apparatus 102, which will not be repeated here. The receiving apparatus 122 can include a receiving lens system and an image sensor, and can have a structural configuration similar to that of the receiving apparatus 103, which will not be repeated here. In particular, the projection apparatus 121 and the receiving apparatus 122 can work in a complementary manner as described above to achieve the subsequent processing. Each of the imaging apparatuses in the electronic device 100 includes a lens system and an image sensor. The electronic device 100 can use at least one of the imaging apparatuses to take photographs.

The foregoing description, for purpose of explanation, has been described with reference to specific embodiments. It is to be noted that TABLES 1A-4C show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A projection lens system comprising two lens elements, the two lens elements being, in order from a magnification side to a reduction side along an optical path: a first lens element and a second lens element, each of the two lens elements having a magnification-side surface facing the magnification side and a reduction-side surface facing the reduction side:

wherein the first lens element has refractive power, and at least one of the magnification-side surface and the reduction-side surface of at least one of the two lens elements is aspheric;

wherein the projection lens system has a total of two lens elements, a refractive index of the first lens element with the d-line as a reference wavelength is Nd1, a refractive index of the second lens element with the d-line as a reference wavelength is Nd2, a central thickness of the first lens element is CT1, a central thickness of the second lens element is CT2, an axial distance between the first lens element and the second lens element is T12, an axial distance between the magnification-side surface of the first lens element and an image source surface is TL, a focal length of the projection lens system is f, a maximum distance between a maximum field on the image source surface and an optical axis is YI, and the following conditions are satisfied:

$1.650 < \min(Nd1, Nd2) < 1.900;$ $5.5 < (CT1+CT2)/T12 < 25;$ $1.0 \text{ mm} < TL < 5.0 \text{ mm};$ $0.90 < TL/f < 1.5;$ and $5.0 < TL/YI < 8.0.$ 2. The projection lens system of claim 1, wherein both of the magnification-side surface and the reduction-side surface of at least one of the two lens elements are aspheric, and at least one of the two lens elements is made of plastic material.

3. The projection lens system of claim 1, wherein the refractive index of the first lens element with the d-line as the reference wavelength is Nd1, the refractive index of the second lens element with the d-line as the reference wavelength is Nd2, half of a maximum field of view of the projection lens system is HFOV, and the following conditions are satisfied:

$1.660 \leq \min(Nd1, Nd2) < 1.800$; and $6.0$ degrees $< HFOV < 25.0$ degrees.

4. The projection lens system of claim 1, wherein the central thickness of the first lens element is CT1, the central thickness of the second lens element is CT2, the axial distance between the first lens element the second lens element is T12, and the following condition is satisfied:

$6.0 < (CT1+CT2)/T12 < 20$.

5. The projection lens system of claim 1, wherein a focal length of the first lens element is f1, a focal length of the second lens element is f2, a curvature radius of the magnification-side surface of the first lens element is R1, a curvature radius of the reduction-side surface of the first lens element is R2, a curvature radius of the magnification-side surface of the second lens element is R3, a curvature radius of the reduction-side surface of the second lens element is R4, and the following conditions are satisfied:

$2.7 < f1/(R2-R1)$; and $|f2/(R3-R4)| < 200$.

6. The projection lens system of claim 1, wherein a focal length of the first lens element is f1, the central thickness of the first lens element is CT1, and the following condition is satisfied:

$0.50 < f1/CT1 < 4.0$.

7. The projection lens system of claim 1, wherein the magnification-side surface of the first lens element is convex in a paraxial region thereof, the reduction-side surface of the first lens element is concave in a paraxial region thereof, the reduction-side surface of the second lens element is convex in a paraxial region thereof, a maximum distance between an optically effective area of the magnification-side surface of the first lens element and an optical axis is Y11, a displacement in parallel with the optical axis from an axial vertex on the magnification-side surface of the first lens element to a boundary of the optically effective area of the magnification-side surface of the first lens element is SAG11, a maximum distance between an optically effective area of the reduction-side surface of the second lens element and the optical axis is Y22, a displacement in parallel with the optical axis from an axial vertex on the reduction-side surface of the second lens element to a boundary of the optically effective area of the reduction-side surface of the second lens element is SAG22, and the following conditions are satisfied:

$1.8 < Y11/SAG11 < 3.0$; and $-3.3 < Y22/SAG22 < -1.6$.

8. The projection lens system of claim 1, wherein the second lens element has positive refractive power, a focal length of the second lens element is f2, the central thickness of the second lens element is CT2, and the following condition is satisfied:

$1.0 < f2/CT2 < 1.8$.

9. The projection lens system of claim 1, wherein the projection lens system further includes a diffractive optical element on the magnification side of the first lens element, and further includes an aperture stop on the magnification side of the first lens element.

10. A projection apparatus, comprising the projection lens system of claim 1 and an imaging light source.

11. The projection apparatus of claim 10, wherein the imaging light source is formed of a vertical-cavity surface-emitting laser (VCSEL) array.

12. The projection apparatus of claim 10, wherein a peak wavelength of the imaging light source is between 780 nm and 1600 nm.

13. An electronic device, comprising the projection apparatus of claim 10 and a receiving apparatus corresponding to the projection apparatus.

14. A projection lens system comprising two lens elements, the two lens elements being, in order from a magnification side to a reduction side along an optical path: a first lens element and a second lens element, each of the two lens elements having a magnification-side surface facing the magnification side and a reduction-side surface facing the reduction side:

wherein the magnification-side surface of the second lens element is concave in a paraxial region thereof, and at least one of the magnification-side surface and the reduction-side surface of at least one of the two lens elements is aspheric;

wherein the projection lens system has a total of two lens elements, a refractive index of the first lens element with the d-line as a reference wavelength is Nd1, a refractive index of the second lens element with the d-line as a reference wavelength is Nd2, a central thickness of the first lens element is CT1, a central thickness of the second lens element is CT2, an axial distance between the first lens element and the second lens element is T12, an axial distance between the magnification-side surface of the first lens element and an image source surface is TL, a focal length of the projection lens system is f, a maximum distance between a maximum field on the image source surface and an optical axis is YI, and the following conditions are satisfied:

$1.650 < \min(Nd1, Nd2) < 1.900$;

$5.5 < (CT1+CT2)/T12 < 37$;

$1.0$ mm $< TL < 5.0$ mm;

$0.90 < TL/f < 1.5$; and $5.0 < TL/YI < 8.0$.

15. The projection lens system of claim 14, wherein the refractive index of the first lens element with the d-line as the reference wavelength is Nd1, the refractive index of the second lens element with the d-line as the reference wavelength is Nd2, the central thickness of the first lens element is CT1, the central thickness of the second lens element is CT2, the axial distance between the first lens element and the second lens element is T12, and the following conditions are satisfied:

$1.660 \leq \min(Nd1, Nd2) < 1.800$; and $5.5 < (CT1+CT2)/T12 < 30$.

16. The projection lens system of claim 14, wherein a focal length of the first lens element is f1, a focal length of the second lens element is f2, a curvature radius of the magnification-side surface of the first lens element is R1, a curvature radius of the reduction-side surface of the first lens element is R2, a curvature radius of the magnification-side surface of the second lens element is R3, a curvature radius of the reduction-side surface of the second lens element is R4, and the following conditions are satisfied:

$2.7 < f1/(R2-R1)$; and $|f2/(R3-R4)| < 200$.

17. The projection lens system of claim 14, wherein an absolute value of a chief ray angle on an image source surface in a maximum field of the projection lens system is |CRA|, a numerical aperture of the projection lens system is NA, a maximum distance between an optically effective area of the magnification-side surface of the first lens element and an optical axis is Y11, a maximum distance between an optically effective area of the reduction-side surface of the second lens element and the optical axis is Y22, and the following conditions are satisfied:

$|CRA| < 5.0$ degrees;

$0.18 < NA < 0.32$; and $0.80 < Y11/Y22 < 1.2$.

18. The projection lens system of claim 14, wherein the reduction-side surface of the first lens element is concave in a paraxial region thereof.

19. The projection lens system of claim 14, wherein the second lens element has positive refractive power, the reduction-side surface of the second lens element is convex in a paraxial region thereof, a focal length of the second lens element is f2, the central thickness of the second lens element is CT2, and the following condition is satisfied:

$0.50 < f2/CT2 < 2.0$.

* * * * *